US008126520B2

(12) United States Patent
Bestle et al.

(10) Patent No.: US 8,126,520 B2
(45) Date of Patent: Feb. 28, 2012

(54) APPARATUS WITH SLIDING HOUSING PARTS

(75) Inventors: Nikolaj Heiberg Bestle, Copenhagen (DK); Morten Rolighed Christensen, Kgs. Lyngby (DK)

(73) Assignee: Nokia Corporation, Espoo (FI)

( * ) Notice: Subject to any disclaimer, the term of this patent is extended or adjusted under 35 U.S.C. 154(b) by 572 days.

(21) Appl. No.: 12/341,128

(22) Filed: Dec. 22, 2008

(65) Prior Publication Data

US 2010/0157517 A1 Jun. 24, 2010

(51) Int. Cl.
*H04M 1/00* (2006.01)
(52) U.S. Cl. .................. 455/575.4; 345/169; 414/733
(58) Field of Classification Search ............. 455/574.1, 455/574.4, 575.4, 553.1, 575.7, 550.1, 552.1, 455/411, 575.3, 556.1; 345/169; 414/733, 414/728, 740
See application file for complete search history.

(56) References Cited

U.S. PATENT DOCUMENTS

| | | | |
|---|---|---|---|
| 6,748,249 B1 | 6/2004 | Eromaki et al. | |
| 7,405,703 B2 * | 7/2008 | Qi et al. | 343/702 |
| 7,450,978 B2 * | 11/2008 | Park | 455/575.3 |
| 7,627,337 B2 * | 12/2009 | Maatta et al. | 455/550.1 |
| 7,774,033 B2 * | 8/2010 | Lee | 455/575.4 |
| 7,778,663 B2 * | 8/2010 | Bong Doo | 455/556.1 |
| 2007/0249394 A1 | 10/2007 | Bong Doo | |

FOREIGN PATENT DOCUMENTS

| | | |
|---|---|---|
| EP | 0536578 | 9/1992 |
| FI | 20085060 | 1/2008 |
| WO | WO 2008/009782 | 1/2008 |

OTHER PUBLICATIONS

Jan. 29, 2010 International Search Report and Written Opinion from parallel International Application No. PCT/FI2009/050892 dated Jan. 29, 2010.

* cited by examiner

*Primary Examiner* — Lam T Mai
(74) *Attorney, Agent, or Firm* — Hollingsworth & Funk, LLC

(57) ABSTRACT

An apparatus with a central housing, a top housing slidably movable relative to the central housing and a bottom housing slidably movable relative to the central housing is provided. The central housing is provided with an area for user input. A first portion of the area for user input is concealed by the top housing when it is in its retracted position and a second portion of the area for user input is concealed by the bottom housing when it is in its retracted position. The first portion of the area for user input is unconcealed when the top housing is in its extended position and the second portion of the area for user input is unconcealed when the bottom housing is in its extended position. The top housing and the optimum housing move in unison between their retracted and extended positions.

10 Claims, 4 Drawing Sheets

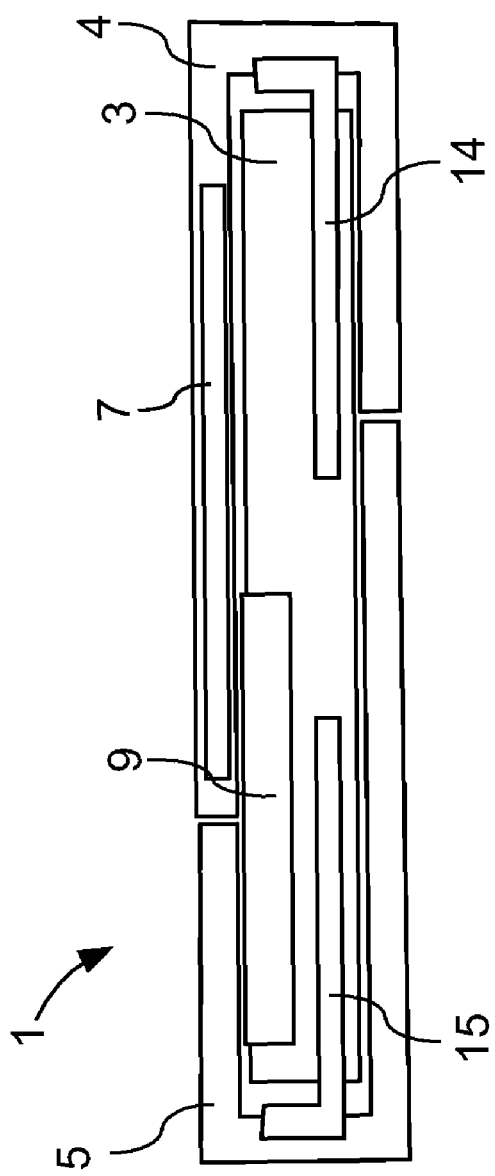
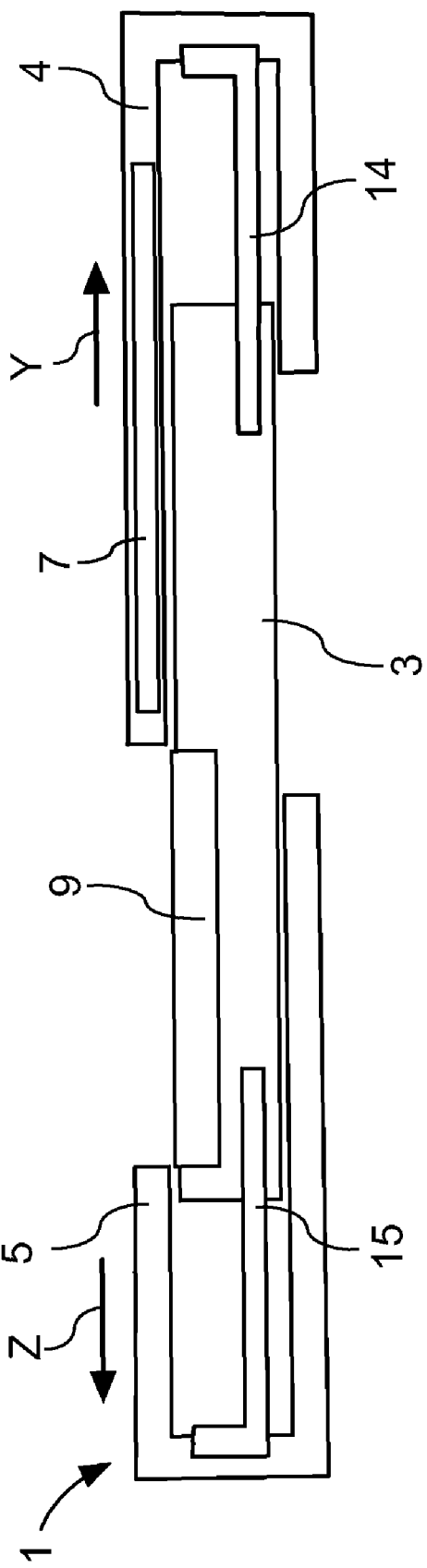
Fig. 3
Fig. 4

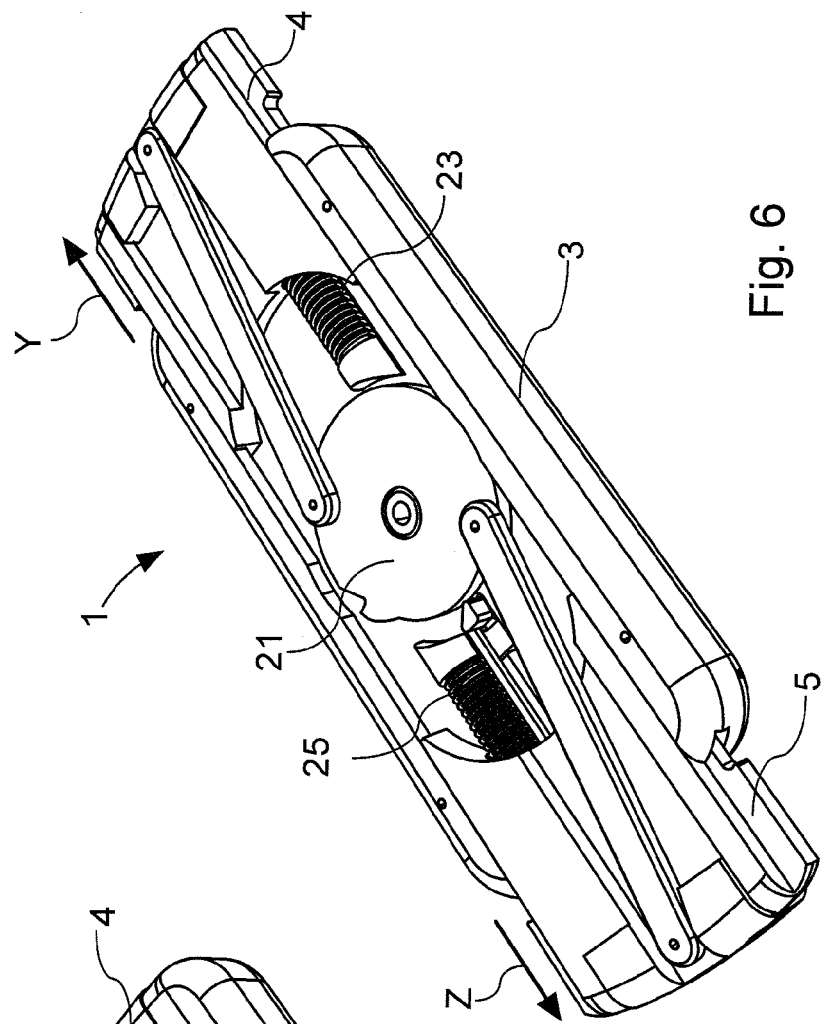
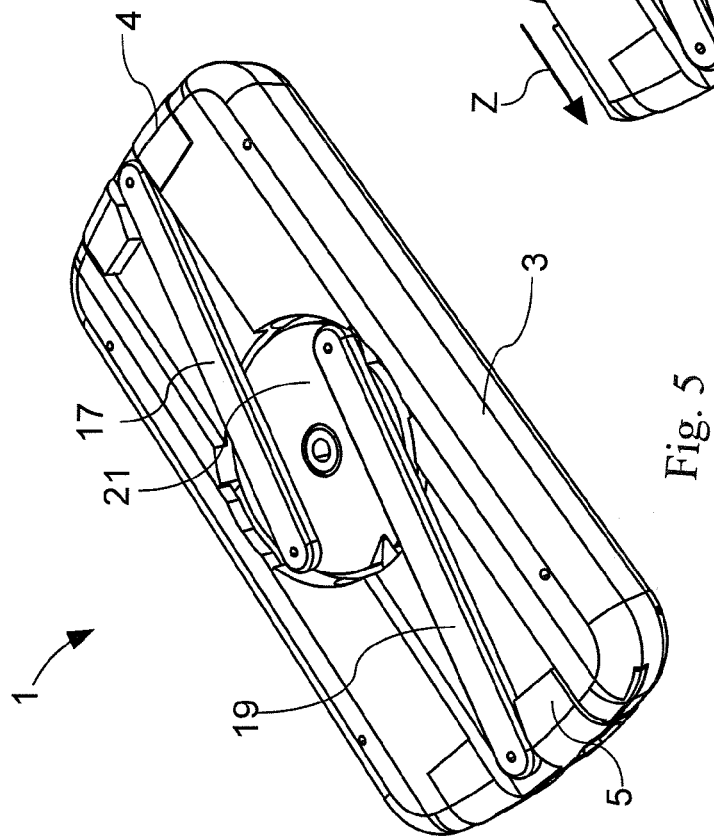
Fig. 6
Fig. 5

APPARATUS WITH SLIDING HOUSING PARTS

FIELD

The present application relates to an apparatus with sliding housing parts, and in particular, to an electronic apparatus with sliding housing parts that can cover and uncover parts of the user interface.

BACKGROUND

In the field of hand held electronic apparatuses there is continuous demand for larger displays and smaller products.

Devices with sliding housing parts, such as slide phones on the market are today made in two configurations:
- Classic slide, where the top part is provided with a screen and a small navigation keypad, and slides over a lower part, that contains ITU-T keypad, and
- Pop-Up slide where the top part contains mainly screen and all keys, and slides into a lower part or holster that covers the keys or only the lower section of the keys, i.e. covers the ITU-T keypad only.

The Classic slide often has less good grip and balance, and it can be difficult for users to access the lowest key row.

The Pop-Up slide often becomes very long when it is open since the length of the lower part or holster is added to the keypad length and display length.

SUMMARY

On this background, it would be advantageous to provide an apparatus with a reduced overall length and good ergonomics.

The disclosed exemplary embodiments provide an apparatus with a central housing part, a top housing part and a bottom housing part, the top housing part is mounted for slidable movement relative to the central housing part between an extended and a retracted position, the bottom housing part is mounted for slidable movement relative to the central housing part between an extended and a retracted position, wherein the sliding movement of the top housing part towards its extended position is opposite in direction to the sliding movement of the bottom housing part towards its extended position.

By using two housing parts that move it is possible to provide improved ergonomics relative to the Classic slide and an improved length relative to the Pop-Up slide.

In another exemplary embodiment the central housing part is provided with an area for user input and the top housing part conceals in its retracted position a first portion of the area for user input and the bottom housing part conceals in its retracted position a second portion of the area for user input.

In another exemplary embodiment a first portion of the area for user input is unconcealed when the top housing is in its extended position, and a second portion of the area for user input is unconcealed when the bottom housing is in its extended position.

By providing a dual stroke movement and splitting the slide movement into two, a part of the stroke is covered by the top housing part and the other half is covered by the bottom housing part, the overall length in the sliding direction of the apparatus is reduced, balance is good and the lowest portion of the user input area is easy to reach for the user.

In another exemplary embodiment the top housing part and the bottom housing part move in unison between their extended and retracted positions.

In another exemplary embodiment the top housing part and the bottom housing part are connected by a mechanism that is configured to let the top housing part and the bottom housing part move in unison between their extended and retracted positions.

In another exemplary embodiment the length of the stroke between the retracted position and the extended position of the top housing part is approximately equal to the length of the stroke between the retracted position and the extended position of the bottom housing part.

In another exemplary embodiment the top cover carries a display screen.

In another exemplary embodiment the area for user input includes a keypad and/or a touchpad.

In another exemplary embodiment the central housing part is received inside the top housing part and the bottom cover part when the top housing part and the bottom housing parts are in their respective retracted positions.

Further objects, features, advantages and properties of the apparatus according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which:

FIG. 3 is a longitudinal-sectional view through the apparatus of FIG. 1 in the retracted position, FIG. 4 is a longitudinal-sectional view through the apparatus of FIG. 1 in the extended position, FIG. 5 is a worked open elevated view of the rear of an apparatus according to an embodiment with the top housing part and the bottom housing part in their retracted position, FIG. 6 is an elevated view of an apparatus according FIG. 5 with the top housing part and the bottom housing part in their extended position.

DETAILED DESCRIPTION

In the following detailed description, the apparatus according to the teachings for this application in the form of a cellular/mobile phone will be described by the embodiments. It should be noted that although only a mobile phone is described the teachings of this application can also be used in any electronic device such as in portable electronic devices such as, PDAs, mobile communication terminals, electronic books and notepads and other electronic devices offering access to information.

Figure 1:
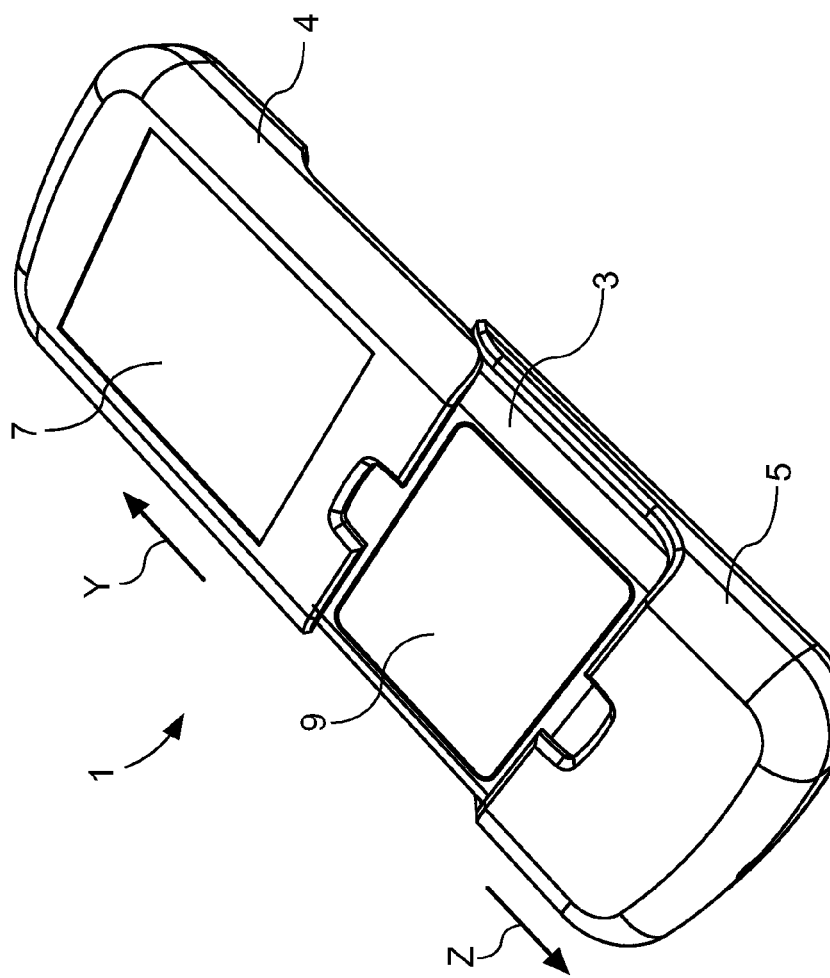
FIG. 1 is an elevated view of an apparatus according to an embodiment with the top housing part and the bottom housing part in their retracted position.
Figure 2:
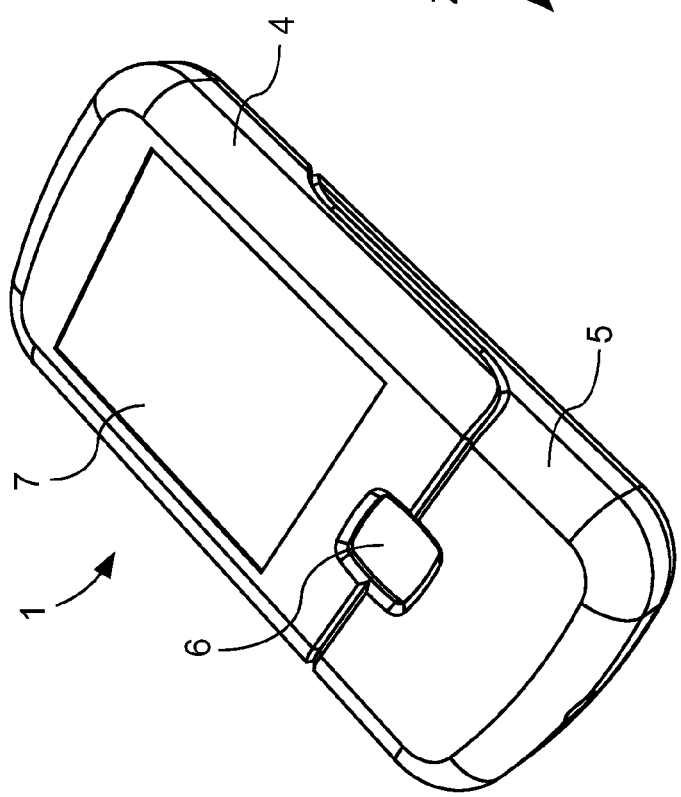
FIG. 2 is an elevated view of an apparatus according FIG. 2 with the top housing part and the bottom housing part in their extended position.
Figure 7:
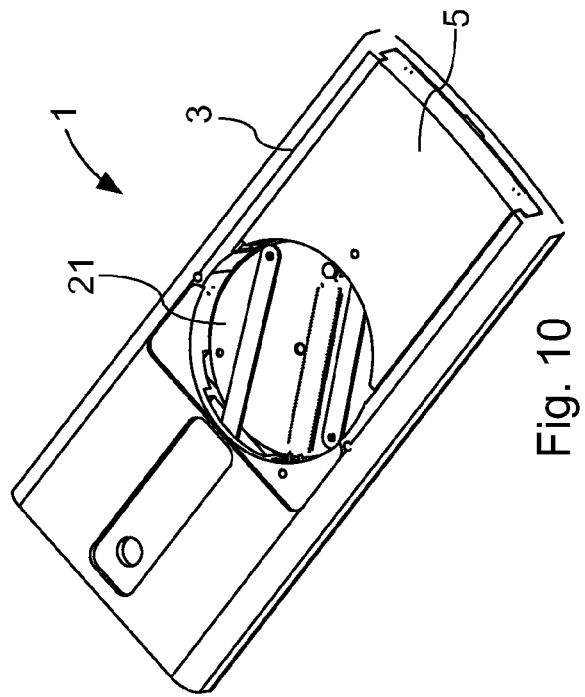
FIGS. 7 and 8 are worked open elevated views of the rear of an apparatus according to another embodiment with the top housing part and the bottom housing part in their extended position, and FIGS. 9 and 10 correspond to FIGS. 7 and 8 respectively with the top housing part and the bottom housing part in their retracted position.
Figure 9:
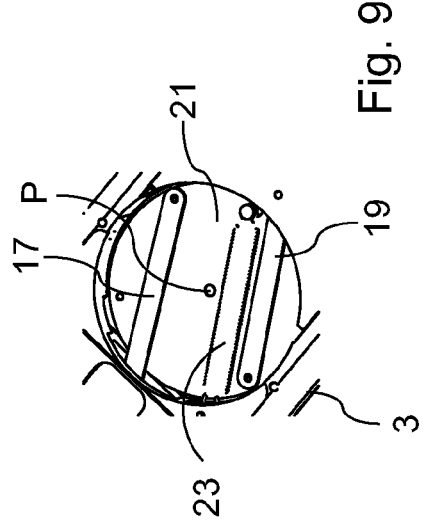
Figure 8:
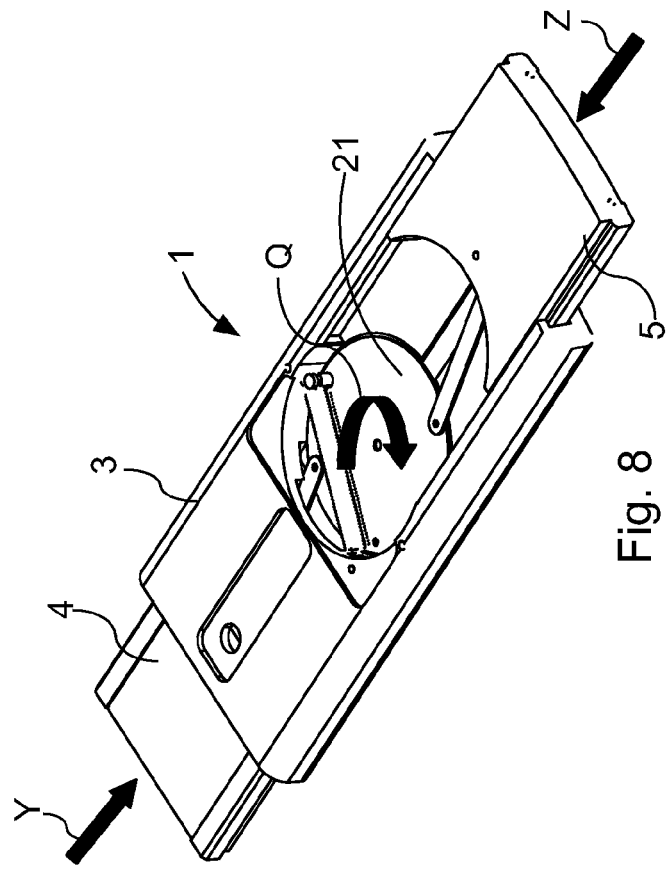
Figure 10:
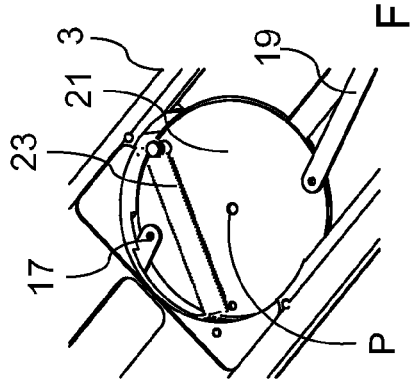

FIGS. 1 and 2 illustrate an embodiment of the mobile terminal 1. In FIG. 1 the mobile terminal 1 is in a retracted position and in FIG. 2, the mobile terminal 1 is in an extended position. These two positions of the mobile terminal 1 will be explained in detail further below.

The mobile terminal 1 comprises a central housing 3, a top housing 4, a bottom housing 5, a speaker or earphone, a microphone, a main or first display 7 and a user input area 9, which may include a keypad of common ITU-T type (alpha-numerical keypad representing characters "0"-"9", "*" and "#") and certain other keys such as soft keys and a joystick or other type of navigational input device. The keypad may be a conventional keypad with discrete mechanical keys or the keypad may be a touch click keypad that uses touch sensing in combination with a click for tactile feedback. Alternatively, the input area can be a touchpad.

FIG. 1 shows the mobile terminal 1 with the top housing part 4 in the retracted position and with the bottom housing part 5 in the retracted position. In this retracted position the user input area 9 is substantially completely concealed except for a small central area 6 that can be used for navigational input when the mobile terminal 1 is in the retracted position. The top housing part 4 may be moved relatively to the central housing part 3 by a user from the retracted position to the extended position by a sliding movement in the direction of arrow "Y". The bottom housing part 5 may be moved relatively to the central housing part 3 by a user from the retracted position to the extended position by a sliding movement in the direction of arrow "Z". The top and bottom housing parts 4, 5 may be return to the retracted position by the user by urging them to slide in the direction opposite to the arrows Y and Z. In an embodiment of the length of the stroke of the top housing part 4 between its retracted and its extended position is substantially equal to the length of the stroke of the bottom housing part 5 between its retracted and its extended position.

FIG. 2 shows the mobile terminal 1 with the top housing part 4 in its extended position and the bottom housing part 5 in the extended position. In this extended position the user input area 9 is unconcealed.

In an embodiment the top housing part 4 and the bottom housing part 5 move between their retracted and extended positions in unison, i.e. the movement between the top housing part 4 and the bottom housing part 5 is linked so that both the housing parts 4, 5 move simultaneously from the retracted to the extended position and vice versa even if only one housing part 4, 5 is urged to do so.

FIGS. 3 and 4 show longitudinal-sectional views of the mobile terminal 1 in the retracted and in the extended position. The sliding movement between the retracted and extended position of the top housing part 4 is guided by a rail 14 and the sliding movement between the retracted and extended position of the bottom housing part 5 is guided by a rail 15. In these figures it may be seen that the display screen 7 covers a portion of the user input area 9 (keypad) in the retracted state. However, by using a slim build in display screen 7 the overall thickness of the device 1 will still be relatively thin.

FIGS. 5 and 6 illustrate a linkage mechanism between the central housing part 3, top housing in part 4 and the bottom housing part 5 that ensures a synchronous movement of the top housing part 4 and the bottom housing part 5. The linkage mechanism includes a disk 21 that is pivotally suspended from the central housing part 3. One extremity of a rod 17 is connected to the disk 21 and the other extremity of the rod 17 is connected to the top housing part 4. One extremity of a rod 19 is connected to the disk 21 and the other extremity of the rod 19 is connected to the bottom housing part 5. Thus, the movement of the housing parts 4, 5 is synchronized via the disk 21. The linkage mechanism is urged by helical springs 23 and 25 to assume either the extended position or the retracted position, i.e. the linkage mechanism is a bi-stable mechanism with the retracted and the extended of positions as stable positions.

FIGS. 7 to 10 disclose another embodiment of the linkage mechanism that controls the movement of the top housing part 4 and the bottom housing part 5. This embodiment uses a disk 21 pivotally suspended from the central housing 3 and a connection rod 17 connected the disk 21 at one end and to the top housing part 4 at its opposite end and a connection rod 19 connected the disk 21 at one end and to the bottom housing part 5 at its opposite end. In this embodiment one extremity of a helical tension spring 23 is connected to the central housing part 3 and the other extremity to the disk 21. The connection points between the extremities of the helical spring 23 are chosen such that the helical spring 23 has a short length in the extended position shown in FIGS. 7 and 8, has a high length in an intermediate position between the extended position and the retracted position and has again a short length in the retracted position. This is obtained by letting the helical 23 spring pass the pivot point P of the disk 21 when the top housing part 4 and the bottom housing part 5 are substantially in the intermediate position. Thus, when the user urges the top housing part 4 and the bottom housing part 5 from the extended position shown in FIGS. 7 and 8 towards the retracted position, as shown by arrows Y and Z, of the disk 21 is urged to rotate in the direction of arrow Q and the helical tension spring 23 is urged to stretch until it passes the pivot point P. Thus, during this part of the movement the user needs to overcome the force that is applied by the helical spring 23. Once the helical spring 23 has passed the pivot point the spring force assists the user in moving the top housing part 4 and the bottom housing part 5 during the remainder of the movement towards the retracted position shown in FIGS. 9 in 10. When the user urges the top housing part 4 and the bottom housing part 5 from the retracted position towards the extended position the force of the helical spring counteracts the movement until the helical spring 23 passes the pivot point P again (at the intermediate position) and then the helical spring assists the user during the remaining part of the movement towards the extended position. Thus, this embodiment relates to a bi-stable mechanism. It should be noted that the disk 21 is effectively forms a crank for connecting rod 17 and a crank for connection rod 19. The disk 21 together with the connection rod 17 and the top housing part 4 forms a crank-slider mechanism with the top housing part 4 forming the slider, and the disk 21 together with the connection rod 19 and the bottom housing part 5 forms a crank-slider mechanism with the bottom housing part 5 forming the slider.

It is noted that other mechanisms may be used for linking the movement between the housing parts 4, 5. Further, it may also be possible to urge the housing parts 4, 5 only towards the extended position with the housing parts 4, 5 being automatically locked in the retracted position and only released by input from the user.

The mobile terminal 1 according to the present embodiment is adapted for communication via a cellular network, such as the GSM 900/1800 MHz network, but may just as well be adapted for use with a Code Division Multiple Access (CDMA) network, a 3G network, or a TCP/IP-based network to cover a possible VoIP-network (e.g. via WLAN, WIMAX or similar) or a mix of VoIP and Cellular such as UMA (Universal Mobile Access).

The various aspects of what is described above can be used alone or in various combinations. It should be noted that the teaching of this application is not limited to the use in mobile communication terminals such as mobile phones, but can be equally well applied in Personal digital Assistants (PDAs), game consoles, MP3 players, personal organizers or any other device designed for handheld devices.

The teaching of the present application has numerous advantages. Different embodiments or implementations may yield one or more of the following advantages. It should be noted that this is not an exhaustive list and there may be other advantages which are not described herein. For example, one advantage of the teaching of this application is that is provides for a device with a reduced length. Another exemplary advantage of the teaching of the present application is that it provides for a device with a good balance.

Although the teaching of the present application has been described in detail for purpose of illustration, it is understood that such detail is solely for that purpose, and variations can be made therein by those skilled in the art without departing from the scope of the teaching of this application.

For example, although the teaching of the present application has been described in terms of a mobile phone, it should be appreciated that the teachings of the present application may also be applied to other types of electronic devices, such as music players, palmtop computers and the like. It should also be noted that there are many alternative ways of implementing the methods and apparatuses of the teachings of the present application.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The term "comprising" as used in the claims does not exclude other elements or steps. The term "a" or "an" as used in the claims does not exclude a plurality. A unit or other means may fulfill the functions of several units or means recited in the claims.

The invention claimed is:

1. An apparatus comprising:
   a central housing part,
   a top housing part, and
   a bottom housing part,
   said top housing part being mounted for slidable movement relative to the central housing part between an extended and a retracted position,
   said bottom housing part being mounted for slidable movement relative to the central housing part between an extended and a retracted position,
   wherein the sliding movement of said top housing part towards its extended position is opposite in direction to the sliding movement of said bottom housing part towards its extended position and the top housing part and the bottom housing part move in unison between their extended and retracted positions.

2. An apparatus according to claim 1, wherein said central housing part is provided with an area for user input and said top housing part conceals in its retracted position a first portion of said area for user input and said bottom housing part conceals in its retracted position a second portion of said area for user input.

3. An apparatus according to claim 2, wherein said first portion of said area for user input is unconcealed when said top housing is in its extended position, and said second portion of said area for user input is unconcealed when said bottom housing is in its extended position.

4. An apparatus according to claim 1, wherein said top housing part and said bottom housing part are connected by a mechanism that is configured to let the top housing part and the bottom housing part move in unison between their extended and retracted positions.

5. An apparatus according to claim 1, wherein the length of the stroke between the retracted position and the extended position of the top housing part is approximately equal to the length of the stroke between the retracted position and the extended position of the bottom housing part.

6. An apparatus according to claim 1, wherein said top cover carries a display screen.

7. An apparatus according to claim 1, wherein said area for user input comprises a keypad and/or a touchpad.

8. An apparatus according to claim 1, wherein said central housing part is received inside said top housing part and said bottom cover part when the top housing part and the bottom housing parts are in their respective retracted positions.

9. An apparatus according to claim 1, wherein said central housing part, said top housing part and said bottom housing part are connected by a linkage mechanism that comprises:
   a first crank and slider mechanism with a first connecting rod, the first crank being pivotally suspended from the central housing and the top housing part moving in unity with the slider or forming the slider,
   a second crank and slider mechanism with a connecting rod in which the second crank is pivotally suspended from the central housing and the bottom housing part moving in unity with the slider or forming the slider, and
   said first crank and said second crank being connected to rotate in unison.

10. An apparatus according to claim 9, wherein one end of a resilient member is connected to the first crank and/or the second crank and another end of said resilient member is connected to said central housing in such a way that the force applied by the resilient member to the crank is lowest in the retracted position and in the extended position and highest in an intermediate position between said retracted position and extended position.

* * * * *